US011582410B2

(12) United States Patent
Bong et al.

(10) Patent No.: US 11,582,410 B2
(45) Date of Patent: Feb. 14, 2023

(54) DYNAMIC VISION SENSOR AND IMAGE PROCESSING DEVICE INCLUDING THE SAME

(71) Applicant: Samsung Electronics Co., Ltd., Suwon-si (KR)

(72) Inventors: Jong Woo Bong, Seoul (KR); Yun Jae Suh, Suwon-si (KR); Seung Nam Choi, Suwon-si (KR); Jun Seok Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/471,459

(22) Filed: Sep. 10, 2021

(65) Prior Publication Data

US 2022/0210349 A1 Jun. 30, 2022

(30) Foreign Application Priority Data

Dec. 31, 2020 (KR) ........................ 10-2020-0189879

(51) Int. Cl.
*H04N 5/355* (2011.01)
*H04N 5/343* (2011.01)
*H04N 5/369* (2011.01)
*H04N 5/3745* (2011.01)
*H04N 5/361* (2011.01)

(52) U.S. Cl.
CPC ............. *H04N 5/355* (2013.01); *H04N 5/343* (2013.01); *H04N 5/361* (2013.01); *H04N 5/3698* (2013.01); *H04N 5/37457* (2013.01)

(58) Field of Classification Search
None
See application file for complete search history.

(56) References Cited

U.S. PATENT DOCUMENTS

| | | | |
|---|---|---|---|
| 7,728,269 | B2 | 6/2010 | Lichtsteiner et al. |
| 9,257,461 | B2 | 2/2016 | Cho et al. |
| 9,600,123 | B2 | 3/2017 | Shimizu |
| 10,498,977 | B2 | 12/2019 | Berner |
| 10,516,838 | B2 | 12/2019 | Suh et al. |
| 10,516,876 | B2 | 12/2019 | Hicks |
| 2020/0236311 | A1 | 7/2020 | Suh et al. |
| 2020/0396409 | A1* | 12/2020 | Posch ............... H04N 5/37455 |
| 2021/0385402 | A1* | 12/2021 | Zhu ...................... H04N 5/3742 |
| 2022/0021837 | A1* | 1/2022 | Zhu ................... H04N 5/37455 |

* cited by examiner

*Primary Examiner* — Quan Pham
(74) *Attorney, Agent, or Firm* — Harness, Dickey & Pierce, P.L.C.

(57) ABSTRACT

A dynamic vision sensor may include a pixel array including at least a first photoreceptor and a second photoreceptor, the first photoreceptor and the second photoreceptor including at least one first pixel and at least one second pixel, respectively, the at least one first pixel and the at least one second pixel configured to generate at least one first photocurrent and at least one second photocurrent in response to an incident light, respectively, and the first photoreceptor and the second photoreceptor configured to a first and second log voltages based on the at least one first photocurrent and the at least one second photocurrent, respectively, processing circuitry configured to, amplify the first and second log voltages, detect a change in intensity of the light based on the amplified first log voltage, the amplified second log voltage, and a reference voltage, and output an event signal corresponding to the detected value.

19 Claims, 9 Drawing Sheets

DYNAMIC VISION SENSOR AND IMAGE PROCESSING DEVICE INCLUDING THE SAME

CROSS-REFERENCE TO RELATED APPLICATION

This U.S. non-provisional application claims the benefit of priority under 35 U.S.C. § 119 from Korean Patent Application No. 10-2020-0189879, filed on Dec. 31, 2020 in the Korean Intellectual Property Office, the contents of which are herein incorporated by reference in its entirety.

BACKGROUND

Various example embodiments of the inventive concepts relate to an image processing device including a vision sensor, a system including the vision sensor, and/or a method of operating the vision sensor.

In general, an image sensor may be broadly divided into an image sensor that operates synchronously and an image sensor that operates asynchronously. A typical example of the image sensor that operates synchronously is a CMOS (complementary metal-oxide semiconductor) image sensor. A typical example of the image sensor that operates asynchronously is a vision sensor such as a DVS (dynamic vision sensor), however, the dynamic vision sensor may also operate synchronously on a frame basis.

The dynamic vision sensor (DVS) functions like a human retina without collecting scene in frames. That is, the dynamic vision sensor may transmit only a change in brightness (e.g., an event) of a pixel at a particular position in the scene when an event occurs.

The output of the dynamic vision sensor is a stream of events in which each event is related to a particular state. For example, the particular state is a binary value that indicates whether the brightness of the associated event changes positively or negatively in comparison to a position of the event in the camera array and a state immediately before the associated position.

SUMMARY

Aspects of at least one example embodiment of the inventive concepts provide a dynamic vision sensor capable of accurately measuring a photocurrent even at a low illuminance and/or measuring a dark current in a lightless dark state.

Aspects of at least one example embodiment of the inventive concepts also provide an image processing device capable of accurately measuring a photocurrent even at a low illuminance and/or measuring a dark current in a lightless dark state.

At least one example embodiment of the inventive concepts provides a dynamic vision sensor (DVS) which may include a pixel array including at least a first photoreceptor and a second photoreceptor, the first photoreceptor and the second photoreceptor each including at least one first pixel and at least one second pixel, respectively, the at least one first pixel and the at least one second pixel configured to generate at least one first photocurrent and at least one second photocurrent in response to an incident light, respectively, and the first photoreceptor and the second photoreceptor configured to a first and second log voltages based on the at least one first photocurrent and the at least one second photocurrent, respectively, processing circuitry configured to, amplify the first and second log voltages, detect a change in intensity of the light based on the amplified first log voltage, the amplified second log voltage, and a reference voltage, and output an event signal corresponding to the detected change in intensity of light, a first switch configured to alternately connect a first output node of the first photoreceptor to a power supply voltage node or a first node, and a second switch configured to alternately connect a second output node of the second photoreceptor and the power supply voltage node or the first node.

At least one example embodiment of the inventive concepts provides a dynamic vision sensor which may include a first photoreceptor including N pixels, the first photoreceptor configured to output a first log voltage based on a first photocurrent generated in response to an incident light, where N is a natural number, the first photocurrent being a sum of photocurrents generated by the N pixels, a second photoreceptor including M pixels, the second photoreceptor configured to output a second log voltage based on a second photocurrent generated in response to the incident light, where M is a natural number different from N, the second photocurrent being a sum of photocurrents generated by the M pixels, and processing circuitry configured to, amplify a first log voltage and a second log voltage associated with the first and second photoreceptors, respectively, detect a change in intensity of light based on the amplified first log voltage, the amplified second log voltage, and a reference voltage, output an event signal corresponding to the detected change in intensity of light, and determine a pixel average photocurrent based on a current difference value between the first photocurrent and the second photocurrent.

At least one example embodiment of the inventive concepts provides an image processing device which may include a plurality of Dynamic Vision Sensor (DVS) pixel arrays, each of the plurality of DVS pixel arrays belonging to either a first photoreceptor or a second photoreceptor, and the plurality of DVS pixel arrays each configured to output a log voltage based on a photocurrent generated in response to an incident light, processing circuitry configured to, amplify the log voltage, detect a change in intensity of the light based on the amplified log voltage and a reference voltage, output an event signal corresponding to the detected change in intensity of the light, issue a time stamp related to time at which the event signal changes, generate and outputs event data packets based on an addresses of the pixel, the event signal, and the time stamp, determine a first photocurrent based on a sum of photocurrents generated by the pixel arrays belonging to the first photoreceptor, determine a second photocurrent based on a sum of photocurrents generated by the pixel arrays belonging to the second photoreceptor, and detect an average photocurrent based on a current difference value between the first photocurrent and the second photocurrent.

However, aspects of the example embodiments of the inventive concepts are not restricted to the one set forth herein. The above and other aspects of the example embodiments of the inventive concepts will become more apparent to one of ordinary skill in the art to which the inventive concepts pertains by referencing the detailed description of the example embodiments given below.

DETAILED DESCRIPTION

Hereinafter, various example embodiments of the inventive concepts will be described referring to the accompanying drawings.

Figure 1:
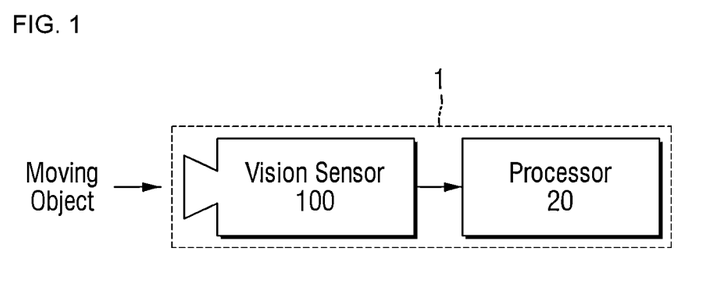
FIG. 1 is a block diagram showing an image processing device according to some example embodiments.

FIG. 1 is a block diagram showing an image processing device according to some example embodiments.

Referring to FIG. 1, an image processing device 1 may be configured to process not only asynchronous events but also synchronous events. For example, the image processing device 1 may generate asynchronous packets related to an event and also synchronous frames related to the event. The image processing device 1 may include at least one vision sensor 100 and/or at least one processor 20, etc., but the example embodiments are not limited thereto, and for example, the image processing device 1 may include a greater or lesser number of constituent elements, such as memory, a storage device, etc.

The vision sensor 100 may detect (e.g., measure and/or sense, etc.) a change in intensity of incident light, and may output an event signal in response to the detected change in intensity of incident light, but is not limited thereto. For example, when an event in which the light intensity increases occurs, the vision sensor 100 may output an ON-event corresponding thereto. In contrast, when an event in which the light intensity decreases occurs, the vision sensor 100 may output an OFF-event.

The vision sensor 100 may be an event-based vision sensor, but the example embodiments are not limited thereto. For example, the vision sensor 100 may access at least one pixel in which the change in light intensity is detected, and may output an event signal, but is not limited thereto. For example, the change in light intensity may be due to a movement of an object captured by the vision sensor 100 and/or due to the movement of the vision sensor 100 itself, etc. In this case, the event signal detected by the vision sensor 100 and/or output from the vision sensor 100 will be an asynchronous event signal.

Additionally, the vision sensor 100 may be a frame-based vision sensor. For example, the vision sensor 100 may scan all of the plurality of pixels constituting and/or included in the vision sensor 100 for each reference cycle, and may output event signals based on the scan operation, but the example embodiments are not limited thereto. However, unlike a general CMOS image sensor, the vision sensor 100 may not output the event signals for every pixel, and may output the event signals only for pixels in which a change in light intensity has been detected. In this case, the event signal that is output from the vision sensor 100 may be converted into a synchronous event signal by at least one processor or the like.

The at least one processor 20 may process the one or more signals detected by the vision sensor 100. The processor 20 may include an ASIC (application specific integrated circuit), an FPGA (field-programmable gate array), a dedicated (e.g., special purpose) image processor, a microprocessor, and the like. Additionally, the processor 20 may include a general purpose processor, but is not limited thereto.

The image processing device 1 of at least one example embodiment of the inventive concepts may measure a pure photocurrent and a dark current in a plurality of pixels of the vision sensor 100 from which a leakage current in an input/output (I/O) pad of the vision sensor 100 is removed. That is, since the image processing device 1 of at least one example embodiment of the inventive concepts may measure accurate QE (Quantum Efficiency), it is possible to improve and/or optimize the pixel circuit design of the vision sensor 100, improve and/or optimize low illuminance characteristics, and/or improve the reliability of the measured value of the image processing device 1.

Figure 2:
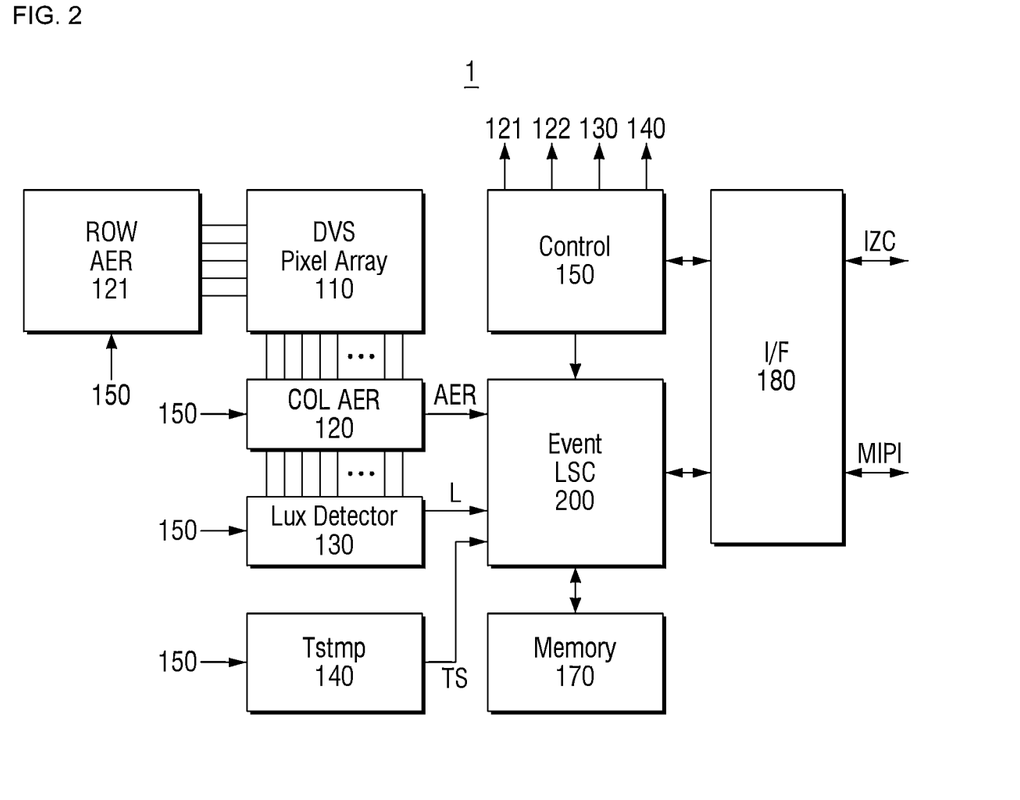
FIG. 2 is a block diagram showing the configuration of the image processing device shown in FIG. 1 according to some example embodiments.

FIG. 2 is a block diagram showing the configuration of the image processing device shown in FIG. 1 according to at least one example embodiment.

Referring to FIG. 2, the image processing device 1 may include a pixel array 110, a row address-event-representation (AER) 121, a column AER 122, an illuminance detector 130, a time stamper 140, a controller 150, an event compensator 200, a memory 170, and/or an I/O interface 180, etc., but the example embodiments are not limited thereto. According to at least one example embodiment, the row AER 121, the column AER 122, the illuminance detector 130, the time stamper 140, the controller 150, the event compensator 200, the memory 170, and/or the I/O interface 180, etc., of the image processing device 1 may be processing circuitry, and the processing circuitry may include hardware, such as processors, processor cores, logic circuits, storage devices, etc.; a hardware/software combination such as at least one processor core executing software and/or executing any instruction set, etc.; or a combination thereof, but the example embodiments are not limited thereto. For example, the processing circuitry more specifically may include, but is not limited to, a field programmable gate array (FPGA), a programmable logic unit, an application-specific integrated circuit (ASIC), s System-on-Chip (SoC), etc.

The row AER 121 enables at least one of the pixels included in the pixel array 110 under the control of the controller 150, and the column AER 122 outputs a sensing value from the enabled pixel. When an event occurs according to and/or based on the movement of an object (e.g., a capture target of the image processing device 1, etc.), the column AER 122 may output an address AER of the pixel in which the event occurs to the event compensator 200. According to some example embodiments, the column AER 122 may receive event values from one or more pixels according to and/or based on an occurrence of event, and an event value may be an ON-event or an OFF-event depending on the change in light intensity, but the example embodiments are not limited thereto.

The illuminance detector 130 detects and outputs the value of the change in light intensity, that is, the illuminance value L, from and/or based on the sensing value that is output from the pixel. The illuminance value L may be detected in pixel units or patch units according to some example embodiments, but is not limited thereto.

The time stamper 140 may issue a time stamp at a desired and/or preset cycle. When an event occurs, the time stamper 140 may issue a time stamp at the time when the event value is generated to the event value that is output from each pixel, but is not limited thereto.

According to some example embodiments, the event compensator 200 may correct the event data packet on the basis of the response time according to an address AER and illuminance value L of the pixel in which an event occurs, but is not limited thereto.

Additionally, the image processing device may not include (e.g., omit) the event compensator 200. In this case, the illuminance value L, the time stamp TS and the address AER of the pixel are transmitted to the I/O interface 180, and the I/O interface 180 may also generate an event data packet.

The controller 150 may control the operation of each of the components 121, 122, 130, 140, 170, 180, and/or 200, etc., but is not limited thereto. Additionally, the data from the memory 170 may be loaded, a desired and/or predetermined operation may be performed, and/or the data may be output based on commands and/or instructions issued by the controller 150.

The memory 170 may be an operating memory of the vision sensor 1. The memory 170 may include a plurality of non-volatile memory devices according to some example embodiments, and for example, the non-volatile memory device may include a flash memory, and/or a resistive memory such as a ReRAM (resistive RAM), a PRAM (phase change RAM), and/or a MRAM (magnetic RAM), etc., but is not limited thereto. The memory 170 may be a buffer memory according to some example embodiments, and may include a cache, a ROM (Read Only Memory), a PROM (Programmable Read Only Memory), an EPROM (Erasable PROM), an EEPROM (Electrically Erasable Programmable Read-Only Memory), a PRAM (Phase-change RAM), a flash memory, a SRAM (Static RAM), and/or a DRAM (Dynamic RAM), etc., according to some example embodiments.

The I/O interface 180 is connected to the controller 150 and may be connected to the external device in an I2C type, and/or is connected to the event compensator 200 and may be connected to the external device in a MIPI type according to at least one example embodiment, but is not limited thereto. Additionally, according to at least one example embodiment, the I/O interface 180 may be connected to the controller 150, the column AER 122, the illuminance detector 150, the time stamper 140, and/or the memory 170, etc. Although it is not shown, the I/O interface 180 may generate and output a packet including the illumination value L, the pixel address AER, and/or the time stamp TS, etc., according to some example embodiments.

In the image processing device 1, according to some example embodiments, the vision sensor 100 includes a pixel array 110, a row AER 121, a column AER 122, an illuminance detector 130, a time stamper 140, and/or a controller 150, etc., and the processor 20 may include an event compensator 200 and/or a memory 170, etc., however the example embodiments are not limited thereto. Additionally, in the image processing device 1, according to some example embodiments, the vision sensor 100 may include the pixel array 110, the row AER 121, the column AER 122, the illuminance detector 130, the time stamper 140, the controller 150, the memory 170, and/or the event compensator 200, etc.

Figure 3:
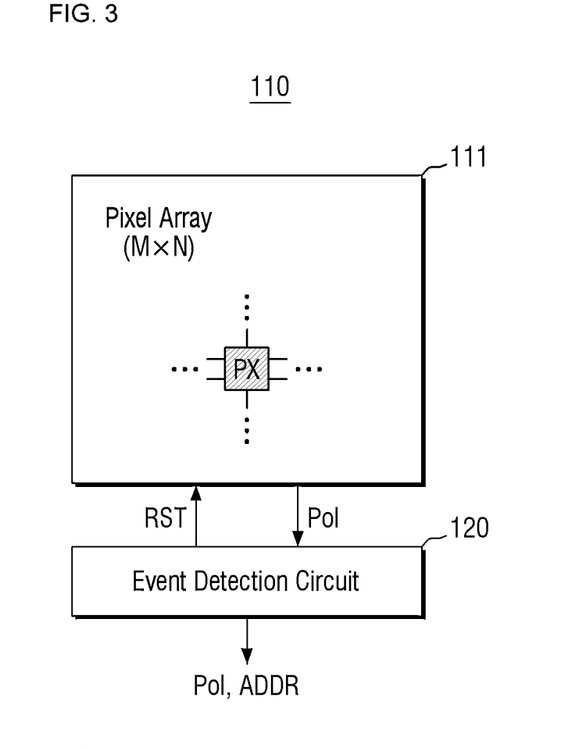
FIG. 3 is a block diagram showing the configuration of the vision sensor shown in FIG. 1 according to some example embodiments.
Figure 4:
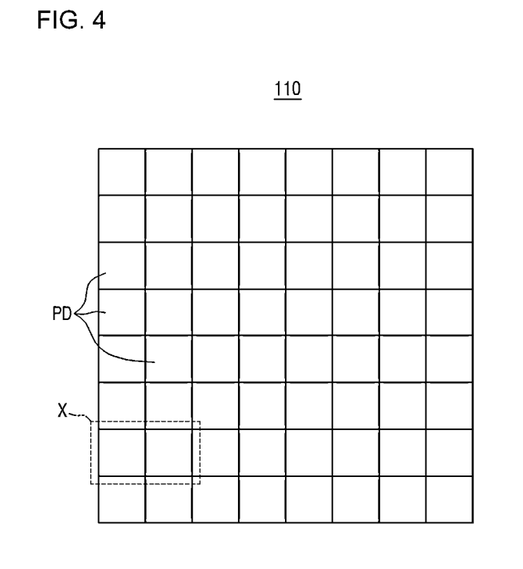
FIG. 4 is a block diagram showing an example configuration of the pixel array shown in FIG. 2 according to some example embodiments.
Figure 5:
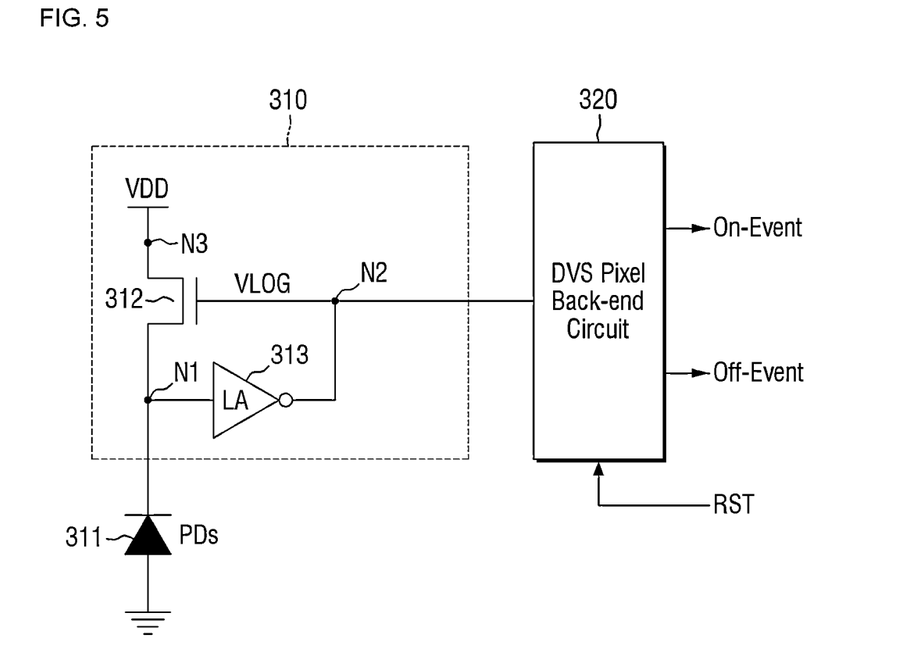
FIGS. 5 and 6 are circuit diagrams showing an example configuration of the pixels shown in FIG. 4 according to some example embodiments.
Figure 6:
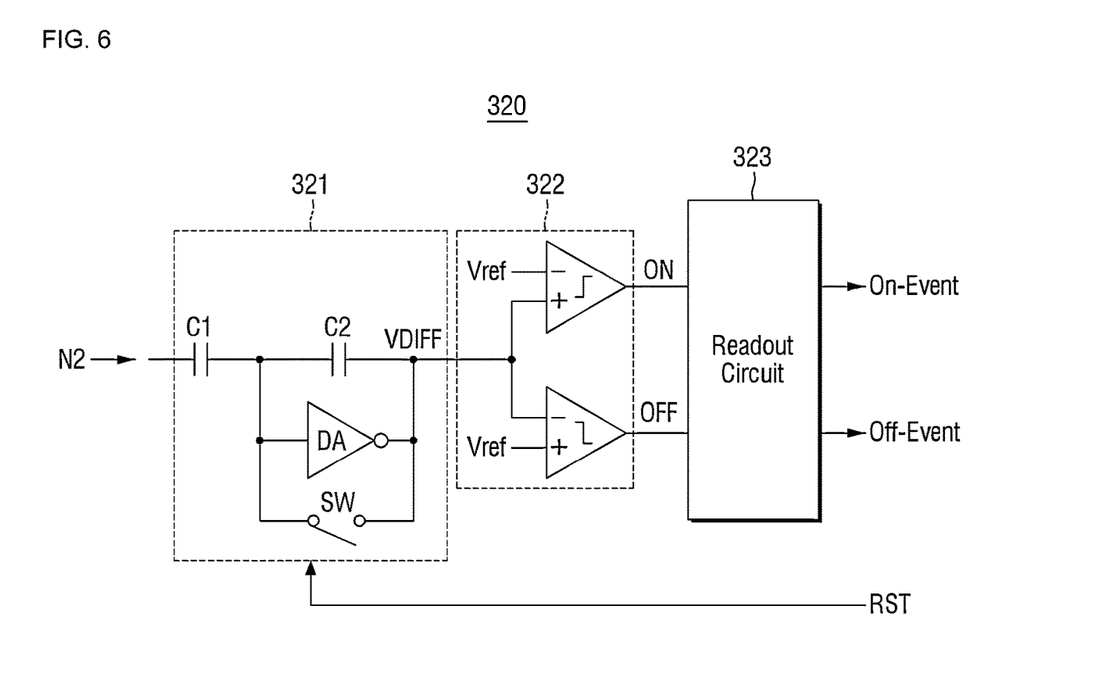

FIG. 3 is a block diagram showing the configuration of the vision sensor shown in FIG. 1 according to some example embodiments. FIG. 4 is a block diagram showing an example configuration of the pixel array shown in FIG. 2 according to some example embodiments, and FIGS. 5 and 6 are circuit diagrams showing an example configuration of the pixels shown in FIG. 4 according to some example embodiments.

Referring to FIG. 3, the vision sensor 100 may include a pixel array 111, and/or an event detection circuit 120, but is not limited thereto. The event detection circuit 120 may be configured to process events that are detected by the pixel array 111 and have increased or decreased intensity of light (e.g., in comparison to a previous intensity of light detected for each individual pixel of the pixel array 111, etc.). For example, the event detection circuit 120 may include at least one or more of various components such as an AER (address event representation), a sampler, a packetizer, and/or a scanner, etc., but the example embodiments are not limited thereto.

The pixel array 111 may include a plurality of dynamic vision sensor (DVS) pixels PD that are arranged in a matrix form along M rows and N columns, where M and N are integers. The pixel array 111 may include a plurality of pixels each configured to detect events in which an intensity of light has increased or decreased, but is not limited thereto. For example, each pixel may be connected to the event detection circuit 120 through a column line in a column direction and through a row line in a row direction. A signal indicating that an event occurs in one or more pixels may be transmitted to the event detection circuit 120 through, for example, the column line, etc. Polarity information (e.g., Pol), that is, whether there is an ON-event in which the light intensity increases in relation to a previous event and/or state of the pixel, and/or an OFF-event in which the light intensity decreases in relation to a previous event and/or state of the pixel, etc.) of the event that occurs at each pixel and the address ADDR may be transmitted to the event detection circuit 120 through, for example, the column line, etc.

The event detection circuit 120 may be configured to process the events that occur. For example, the event detection circuit 120 may generate a time stamp including time information regarding when the event occurs, etc. For example, the event detection circuit 120 may transfer a reset signal RST to the pixel in which the event occurred to reset the pixel.

According to some example embodiments, the plurality of event values that are output from all of the pixels included in the pixel array 110 may constitute a single frame. That is, the frame may include event values of all pixels. Additionally, according to some example embodiments, the frame may include a plurality of event values of some pixels (e.g., a subset of pixels of the pixel array 111) instead of all of the pixels of the pixel array 111.

According to such example configurations, the events that occur in the pixel array 111 may be processed in units of pixels, in units of pixel groups including the plurality of pixels, in units of columns, or in units of a frame. However, such example embodiments refer to the fact that the events detected through the pixel array 111 may be processed in various ways, and the example embodiments of the inventive concepts are not limited thereto.

Referring to FIG. 4, the pixel array 110 includes a plurality of DVS pixels PD arranged in the form of an M×N array (M, N are natural numbers equal to or greater than 1), and the pixel array 110 may detect a change in light intensity in one or more of the plurality of DVS pixels PD and may output the plurality of event frames.

The pixel array 110 may include the plurality of patches according to some example embodiments. The patch X may also be referred to by other names such as a cluster, a window, and/or a group, etc., but is not limited thereto.

The patch X may include a plurality of DVS pixels. The patch X may be a K×L pixel array according to some example embodiments, and each of K and L may be an integer equal to or greater than 0, and according to some example embodiments, K and L may be smaller than M and N, but the example embodiments are not limited thereto.

That is, according to at least one example embodiment, the pixel array 110 may include a plurality of patches X, and each patch may include a plurality of pixels. The event detection circuit 120 may be operated in pixel units according to some example embodiments, and may also be operated in patch units according to some example embodiments, but the example embodiments are not limited thereto.

Referring to FIG. 5, the DVS pixel 300 includes a photoreceptor 310, and/or a DVS pixel back-end circuit 320, etc., but is not limited thereto.

The photoreceptor 310 may include a logarithmic amplifier (LA) 313 and/or a feedback transistor 312, etc., but the example embodiments are not limited thereto. The feedback transistor 312 is connected between a N3 node connected to a power supply terminal VDD and a N1 node which is an input of the logarithmic amplifier 313, and a gate is connected to a N2 node which is an output of the logarithmic amplifier 313. The photoreceptor 310 may include a photoelectric conversion element PD in at least one example embodiment, and may not include the photoelectric conversion element PD in at least one other example embodiment. The logarithmic amplifier 313 may amplify the voltage corresponding to the photocurrent generated by at least one photoelectric conversion element PD of the pixel, and may output a log voltage VLOG of a log scale, but is not limited thereto. The feedback transistor 312 may transmit the log voltage to the DVS pixel back-end circuit 320 based on the log voltage and a desired threshold for the log voltage, but the example embodiments are not limited thereto.

The DVS pixel back-end circuit 320 may perform various processes on the log voltage VLOG. In some example embodiments, the DVS pixel back-end circuit 320 amplifies the log voltage VLOG, compares the amplified voltage with a reference voltage to distinguish whether light incident on the photoelectric conversion element PD is light in which the intensity increases or decreases from a previous light intensity level associated with the photoelectric conversion element PD, and may output an event signal (that is, On-event or Off-event) corresponding to the distinguished value. After the DVS pixel back-end circuit 320 outputs an On-event or Off-event, the DVS pixel back-end circuit 320 may be reset by a reset signal RST, but is not limited thereto.

Referring to FIG. 6, the DVS pixel back-end circuit 320 may include a differentiator 321, a comparator 322, and/or a readout circuit 323, etc., but is not limited thereto.

The differentiator 321 may be configured to amplify the output of the photoreceptor 310, that is, a voltage VLOG that is output from the N2 node, to generate a voltage VDIFF. According to some example embodiments, the differentiator 321 may include one or more capacitors, e.g., capacitors C1 and C2, etc., a differentiator amplifier DA, and/or a switch SW operated by the reset signal RST, but the example embodiments are not limited thereto. For example, the one or more capacitors C1 and C2 may store electrical energy generated by at least one photoelectric conversion element PD. For example, the capacitances of the one or more capacitors C1 and C2 may be appropriately selected in consideration of and/or based on the shortest time (e.g., the refractory period) between two events that may occur consecutively in one pixel, but the example embodiments are not limited thereto. Pixels may be initialized when the switch SW is switched on by the reset signal RST, etc. The reset signal RST may be received from the row AER circuit (e.g., 121 of FIG. 2), but is not limited thereto.

The comparator 322 may compare levels (e.g., voltage levels) of the output voltage VDIFF and the reference voltage Vref of the differential amplifier DA, and may distinguish whether the event detected by pixel is an On-event or an Off-event. When an event in which the light intensity increases is detected compared to a previous light intensity level associated with the same photoelectric conversion element PD (e.g., pixel), the comparator 322 may output a signal ON indicating the On-event, and when an event in which the light intensity decreases is detected compared to a previous light intensity level associated with the same photoelectric conversion element PD (e.g., pixel), the comparator 322 may output a signal OFF indicating then Off-event.

The readout circuit 323 may transmit information about the event that occurs in the pixel. The information about the event that is output from the readout circuit 323 may include information (e.g., data and/or bits) about whether the event that occurs is an On-event or an Off-event. The event information may be called polarity information (e.g., Pol of FIG. 3) about and/or regarding the event that is output from the readout circuit 323. The polarity information Pol may be transmitted to the raw AER circuit (e.g., 121 of FIG. 2).

On the other hand, the configuration of pixel shown in FIG. 6 is an example and not limited thereto, and the example embodiments of the inventive concepts will also be applied to DVS pixels of various configurations configured to detect changing intensity of light and distinguish the type of events.

Figure 7:
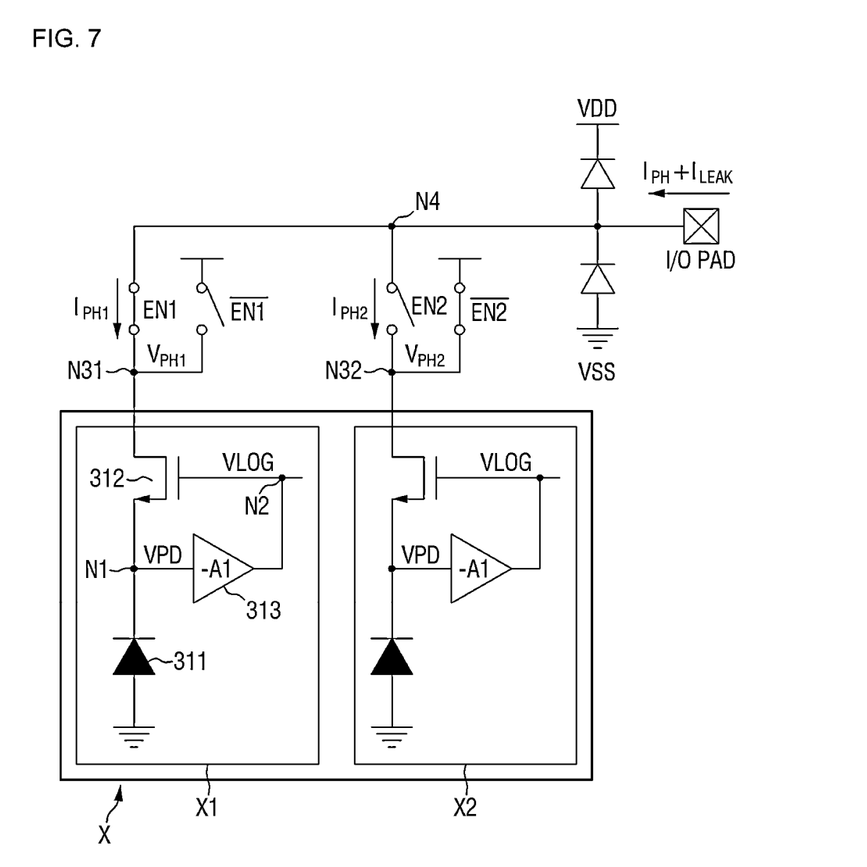
FIG. 7 shows an example configuration of the photoreceptor operating circuit of FIG. 5 according to some example embodiments.
Figure 8:
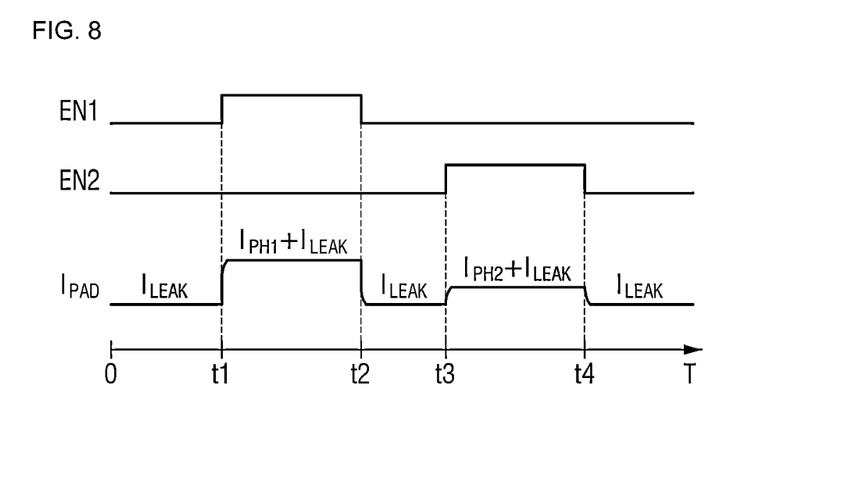
FIG. 8 shows a timing diagram showing the enable signal and photocurrent of FIG. 7 according to some example embodiments.

FIG. 7 shows an example configuration of the photoreceptor operating circuit of FIG. 5 according to some example embodiments, and FIG. 8 shows a timing diagram showing the enable signal and photocurrent of FIG. 7 according to some example embodiments.

Referring to FIGS. 7 and 8, according to some example embodiments, the pixel array may include a plurality of patches X. The patch X includes the plurality of DVS pixels. The plurality of DVS pixels (e.g., FIG. 4) within a single patch X belong to one of a first photoreceptor X1 and a second photoreceptor X2, but the example embodiments are not limited thereto, and for example, there may be a greater or lesser number of photoreceptors included in the patch X. That is, the first photoreceptor X1 may include at least one first pixel, and the second photoreceptor X2 may include at least a second pixel, etc. The first pixel and the second pixel are pixels different from each other. The configurations of the first or second photoreceptor X1, X2 are the same as, but is not limited to, for example, that of the photoreceptor 310 of FIG. 5, but are not limited thereto.

The first photoreceptor X1 and the second photoreceptor X2 may be enabled alternately from each other. That is, when the first photoreceptor X1 is enabled, the second photoreceptor X2 is disabled, and when the first photoreceptor X1 is disabled, the second photoreceptor X2 may be enabled, but the example embodiments are not limited thereto.

More specifically, the first photoreceptor X1 and the second photoreceptor X2 are alternately connected to a N4 node and a power supply voltage node (hereinafter referred to as VDD node), and may be enabled or disabled. In the at least one example embodiment of FIG. 7, the N4 node may be connected to an I/O pad (e.g., I/O PAD), but the example embodiments are not limited thereto. The I/O pad may be a pad for being connected from the outside of the dynamic vision sensor to measure a quantum efficiency (QE) of the photoreceptor.

The VDD node or the I/O pad may be connected to the output node N4 of the photoreceptor 310. For example, if the feedback transistor 312 is an NMOS transistor, the N4 node may be connected to a drain terminal of the feedback transistor, but the example embodiments are not limited thereto. Additionally, in another example, if the feedback transistor 312 is a PMOS transistor, the N4 node may be connected to a source terminal of the feedback transistor, etc. For the convenience of the description, a single end of the feedback transistor or the output node N2 of the photoreceptor will be described below, but the example embodiments are not limited thereto.

According to some example embodiments, one end (e.g., a first end) of the feedback transistor 312 of the first photoreceptor X1 may be connected to the N4 node or to the VDD node according to and/or based on a first enable signal (e.g., EN1, $\overline{EN1}$) having opposite phases to each other. One end (e.g., a first end) of the feedback transistor 312 of the second photoreceptor X2 may be connected to the N4 node or to the VDD node according to and/or based on a second enable signal (e.g., EN2, $\overline{EN2}$) having opposite phases to each other. The first enable signal EN1 and the first inverted enable signal $\overline{EN1}$ have opposite phases to each other. The second enable signal EN2 and the second inverted enable signal $\overline{EN2}$ have opposite phases to each other. The dynamic vision sensor may further include an inverter (not shown) to generate the first and second inverted enable signals $\overline{EN1}$, $\overline{EN2}$ at the first and second enable signals EN1 and EN2, etc.

The first enable signal EN1 and the second enable signal EN2 may have opposite phases to each other, but the example embodiments are not limited thereto. That is, if the first photoreceptor X1 is connected to the N4 node by the first switch and not connected to the VDD node by the first inverting switch, the output node of the second photoreceptor X1 is connected to the VDD node by the second switch, and may not be connected to the N4 node by the second inverting switch, etc. Also, if the output node of the first photoreceptor X1 is connected to the VDD node by the first switch and not connected to the N4 node by the first inverting switch, the output node of the second photoreceptor X1 is connected to the N4 node by the second switch, and may not be connected to the VDD node by the second inverting switch, etc.

Referring to FIG. 8, if the first enable signal EN1 is low (e.g., from time 0 to t1, etc.), the output node of the first photoreceptor X1 is connected to the VDD node, but is not limited thereto. That is, when the first photoreceptor is in a disabled state, the photocurrent does not flow through the I/O pad, but a leakage current $I_{LEAK}$ due to the photoreceptor itself (e.g., a parasitic component caused by the I/O pad or the like) may flow through the I/O pad. However, when the first enable signal EN1 is applied high (e.g., from t1 to t2, etc.), the output node of the first photoreceptor X1 is connected to the I/O pad and enabled. In this case, the first photocurrent $I_{PH1}$ may be added to the leakage current $I_{LEAK}$ and flow through the I/O pad (e.g., $I_{PH1}+I_{LEAK}$), but the example embodiments are not limited thereto.

On the other hand, the second enable signal EN2 may have a phase opposite to that of the first enable signal EN1, but is not limited thereto. That is, while the second enable signal EN2 is held low during the time 0 to t2 (e.g., from 0 to time t2), the output node of the second photoreceptor X2 is connected to the VDD node, that is, the second photoreceptor is in a disabled state, but the example embodiments are not limited thereto. In this case, the photocurrent $I_{PH}$ does not flow through the I/O pad, but the leakage current $I_{LEAK}$ may flows through the I/O pad. When the first enable signal EN1 is changed to low at time t2, after that, the second enable signal EN2 is changed from low to high at time t3, but is not limited thereto. In that case, the times t2 to t3 may be a delay time for reducing and/or preventing the first photoreceptor X1 and the second photoreceptor X2 from being enabled at the same time. When the second photoreceptor X2 is changed from the disabled state to the enabled state at time t3, the output node of the second photoreceptor X2 is connected to the I/O pad, and the second photocurrent $I_{PH2}$ may be added to the leak current $I_{LEAK}$ and flow through the I/O pad (e.g., $I_{PH2}+I_{LEAK}$).

The dynamic vision sensor including the first and second photoreceptors may operate so that the first and second photoreceptors are alternately enabled according to and/or based on the first enable signal and the second enable signal as described above, however the example embodiments are not limited thereto, and for example, there may be a greater or lesser number of photoreceptors and/or enable signals, etc. Accordingly, in the I/O pad, a current value (e.g., $I_{PAD@EN1}$, $I_{PAD@EN2}$) obtained by adding the leakage current to each of the first and second photocurrents may be measured on the basis of the first and second enable signals as shown in Formula 1.

$$I_{PAD@EN1}=I_{PH1}+I_{LEAK} \quad \text{(Formula 1)}$$

$$I_{PAD@EN2}=I_{PH2}+I_{LEAK} \quad \text{(Formula 2)}$$

At this time, when the light incident on the photoreceptor has high illuminance, the leakage current does not have a large effect. However, in low illuminance, it may be difficult to accurately measure the photocurrent $I_{PH}$ due to the leakage current. The dynamic vision sensor (e.g., the processing circuitry of the dynamic vision sensor, etc.) according to some example embodiments may measure an accurate photocurrent value, using a difference value $I_{PH(N1-N2)}$ between the first photocurrent of the first photoreceptor and the second photocurrent of the second photoreceptor.

$$\begin{aligned}I_{PH(N1-N2)} &= I_{PAD@EN1} - I_{PAD@EN2} \\ &= (I_{PH1} + I_{LEAK}) - (I_{PH2} + I_{LEAK}) \\ &= I_{PH1} - I_{PH2}\end{aligned} \quad \text{(Formula 3)}$$

That is, by measuring the photocurrents of each of the first photoreceptor and the second photoreceptor on the light radiated in the same way, and by utilizing a difference value $I_{PH(N1-N2)}$ thereof, it is possible to measure the pure photocurrent in which the leakage current of the I/O pad is removed, and to more accurately measure the intensity of light at the pixel from the outside.

Accordingly, it possible to measure accurate the quantum efficiency (QE) and dark current in a lightless state. Also, it is possible to improve and/or optimize the design of DVS pixels with more accurate photocurrent measurements, thereby providing an advantage of improving and/or optimizing the low illuminance characteristics of the dynamic vision sensor. Additionally, the reliability of photocurrent measurement values may be improved as well.

On the other hand, according to some example embodiments, one end (e.g., a first end) of the feedback transistor 312 of the first photoreceptor X1 may be connected to the I/O pad or to the VDD node through the N4 node according to and/or based on the enable signal EN. One end (e.g., a first end) of the feedback transistor 312 of the second photoreceptor X2 may also be connected to the I/O pad or to the VDD node through the N4 node according to and/or based on the enable signal EN. In this case, a first switch connected between the first photoreceptor X1 and one end of the feedback transistor 312 may be a PMOS transistor, and the first inverting switch may be an MIMO transistor, but the example embodiments are not limited thereto. A second switch connected between the second photoreceptor X2 and one end of the feedback transistor 312 may be an NMOS transistor, and the second inverting switch may be a PMOS transistor, but the example embodiments are not limited thereto. That is, the first switch, the first inverting switch, the second switch, and/or the second inverting switch, etc., may all be gated according to and/or based on the enable signal EN, but the example embodiments are not limited thereto.

On the other hand, the first and second switches are examples. The configurations of the first and second switches, and the configurations of the first inverting switch and the second inverting switch may also be equally/similarly applied to one or more of the example embodiments described below according to the inventive concepts, but are not limited thereto.

Figure 9:
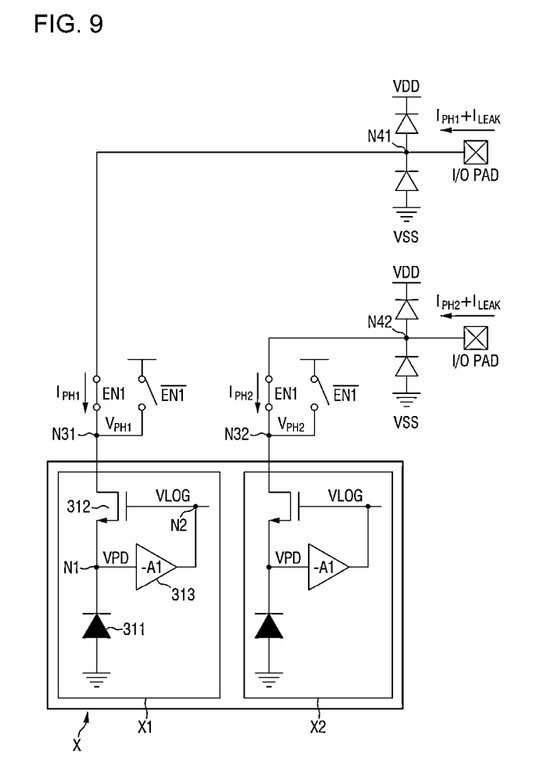
FIG. 9 shows an example configuration of the photoreceptor operating circuit of FIG. 5 according to some example embodiments.

FIG. 9 shows an example configuration of the photoreceptor operating circuit of FIG. 5 according to some example embodiments. For convenience of explanation, repeated explanation of elements shared with FIG. 7 will be omitted.

Referring to FIG. 9, the patch X may include a first photoreceptor X1 and a second photoreceptor X2, but the example embodiments are not limited thereto. The first photoreceptor X1 may be connected to the first I/O pad (e.g., I/O PAD1) according to and/or based on the first enable signal EN1, and may also be connected to the VDD node according to and/or based on the first inverted enable signal $\overline{EN1}$. The second photoreceptor X2 may be connected to the second I/O pad (e.g., I/O PAD2) according to and/or based on the first enable signal EN1, and may also be connected to the VDD node according to and/or based on the first inverted enable signal $\overline{EN1}$.

That is, the first photoreceptor X1 and the second photoreceptor X2 may be connected to I/O pads different from each other, and may be enabled at the same time on the basis of the same first enable signal EN1, but the example embodiments are not limited thereto. That is, each of the first photocurrent $I_{PH1}$ and the second photocurrent $I_{PH2}$ may be measured on the light that is incident equally at the same time on I/O pads that are different from each other.

Figure 10:
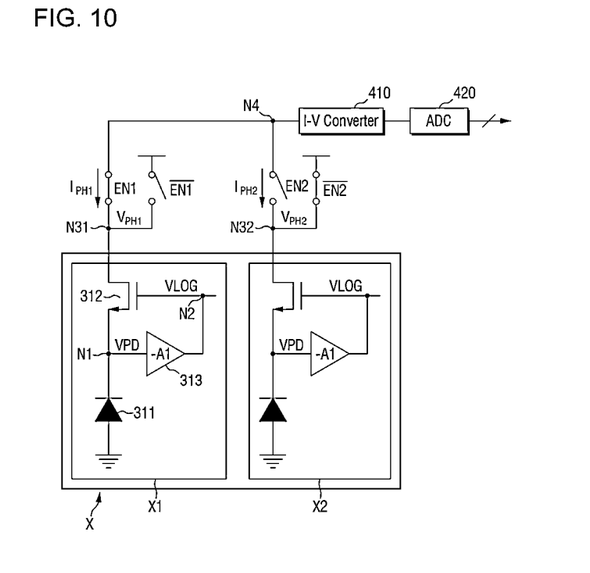
FIG. 10 shows an example configuration of the photoreceptor operating circuit of FIG. 5 according to some example embodiments.

FIG. 10 shows an example configuration of the photoreceptor operating circuit of FIG. 5 according to some example embodiments. For convenience of explanation, repeated explanation of elements shared with FIG. 7 will be omitted.

Referring to FIG. 10, the dynamic vision sensor according to some example embodiments may further include a current-voltage converter (e.g., I-V Converter, 410), and an analog digital converter (e.g., ADC 420), but the example embodiments are not limited thereto. That is, an input terminal of the current-voltage converter 410 is connected to the first node through which the photocurrent of the first photoreceptor X1 and the second photoreceptor X2 flows, and the output terminal of the current-voltage inverter may be connected to the input terminal of the ADC 420, etc.

The current-voltage converter may convert a first photocurrent and/or a second photocurrent into a first voltage $V_{PH1}$ and/or a second voltage $V_{PH2}$. The ADC 420 may convert the first voltage $V_{PH1}$ and the second voltage $V_{PH2}$ into a first digital code and a second digital code, but the example embodiments are not limited thereto.

The dynamic vision sensor may measure a pixel average photocurrent (e.g., average photocurrent for a pixel), that is, the intensity of light, on the basis of the difference value between the first digital code and the second digital code. In at least one example embodiment, the current-voltage converter and the analog digital converter may effectively remove the leakage current and DC offset that may occur in the added circuit.

Figure 11:
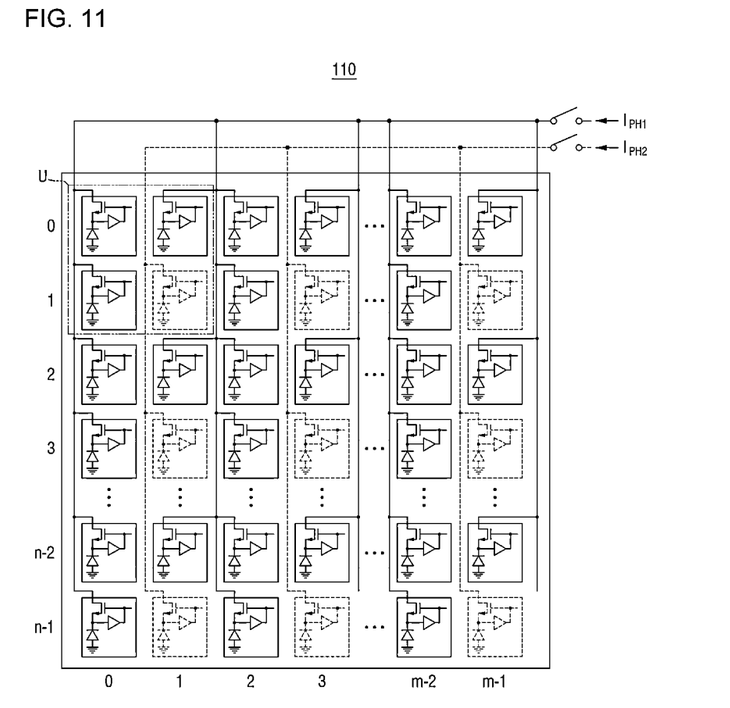
FIG. 11 is a diagram for explaining the operation of the DVS pixel array according to at least one example embodiment.

FIG. 11 is a diagram for explaining the operation of the DVS pixel array according to at least one example embodiment.

Referring to FIG. 11, the pixel array according to some example embodiments may include a plurality of patches U. One unit patch U may include N first photoreceptors and M second photoreceptors according to various example embodiments. At this time, N and M may be natural numbers different from each other. That is, the patch may be configured to have a ratio of N:M, but the example embodiments are not limited thereto.

The total photocurrent of the pixel in the unit patch including a plurality of first photoreceptors and a plurality of second photoreceptors may be measured as in the following Formula 4.

$$I_{PH(Total)} = (I_{PH1} - I_{PH2})/(N-M) \times (N+M) \quad \text{(Formula 4)}$$

That is, the difference value (e.g., $I_{PH1} - I_{PH2}$) between the first photocurrent and the second photocurrent is divided by the difference in number (e.g., N−M) between the first photoreceptor and the second photoreceptor to calculate an average photocurrent in one pixel, and by multiplying the average photocurrent by the total number of photoreceptors (e.g., N+M), the total photocurrent for the pixel may be measured. As an example, the total photocurrent may be a value calculated in the processor by receiving each photocurrent that is output from the I/O pad, but is not limited thereto.

In the example shown, it is assumed that there is a n×m pixel array. The coordinate values of the pixel array increase by 1 toward the lower and right sides, e.g., assuming that the coordinates of the photoreceptor on an upper left end of the pixel array are (0,0), however the example embodiments are not limited thereto.

According to at least one example embodiment, the unit patch U of the shown example may be configured to include, for example, four photoreceptors (0,0) (0,1) (1,0) (1,1), and may have a ratio of 3:1, but the example embodiments are not limited thereto. That is, (0,0) (0,1) (1,0) may be the coordinates of the first photoreceptor, and (1,1) may be the coordinate of the second photoreceptor. As described in FIGS. 1 to 10, according to some example embodiments, the first photoreceptor is enabled alternately with the second photoreceptor, or the first photoreceptor and the second photoreceptor may be connected to I/O pads different from each other and enabled at the same time according to some example embodiments.

In this case, the total pixel photocurrent measured by the I/O pad may be calculated by the following Formula 5.

$$\begin{aligned} I_{PH(Total)} &= (I_{PH1} - I_{PH2})/(N - M) \times (N + M) \quad \text{(Formula 5)} \\ &= (I_{PH1} + I_{PH2})/(3 - 1) \times (3 + 1) \\ &= (I_{PH1} - I_{PH2}) \times 2 \end{aligned}$$

Since the dynamic vision sensor described above may measure the characteristics of DVS pixels on the basis of the difference value of the photocurrent at the two photoreceptors, leak current components are removed, and more reliable photocurrent measurement value may be secured.

Figure 12:
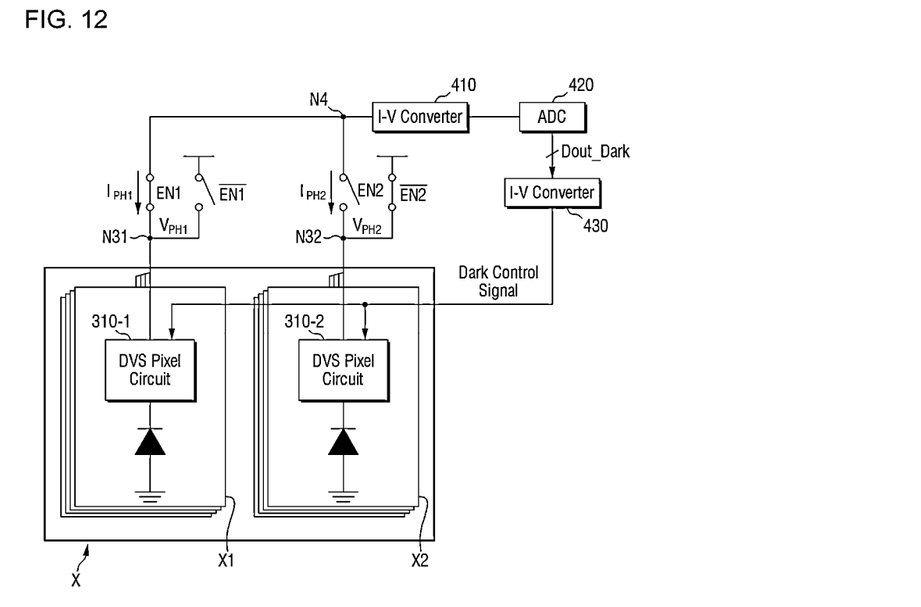
FIG. 12 shows an example configuration of the photoreceptor operating circuit of FIG. 5 according to some example embodiments.
Figure 13:
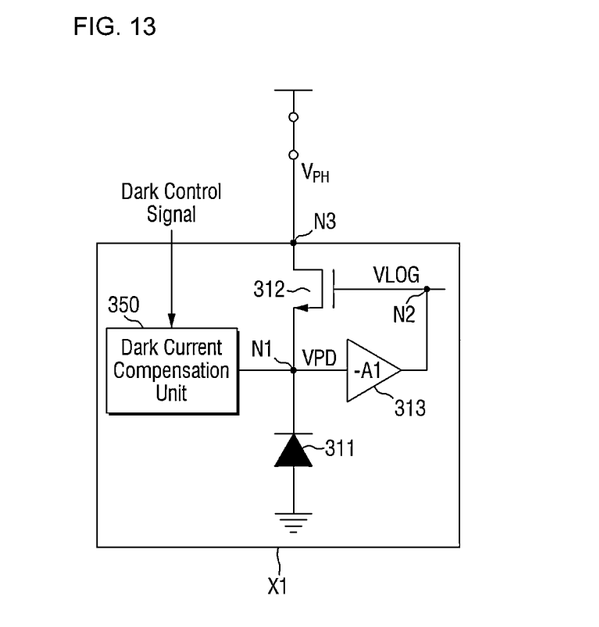
FIG. 13 shows an example configuration of the photoreceptor operating circuit of FIG. 5 according to some example embodiments.
Figure 14:
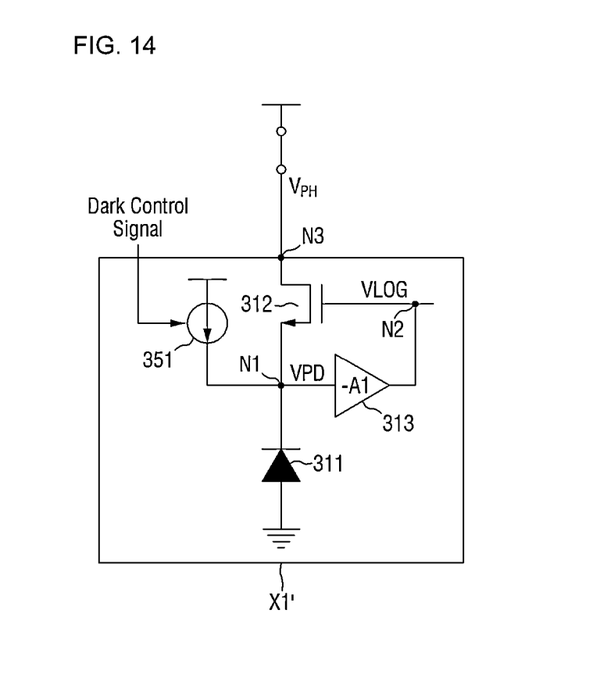
FIG. 14 shows an example configuration of the photoreceptor operating circuit of FIG. 5 according to some example embodiments.

FIG. 12 shows an example configuration of the photoreceptor operating circuit of FIG. 5 according to some example embodiments. FIG. 13 shows an example configuration of the photoreceptor operating circuit of FIG. 5 according to some example embodiments, and FIG. 14 shows an example configuration of the photoreceptor operating circuit of FIG. 5 according to some example embodiments.

For the convenience of explanation, the explanation will focus on the differences between these figures and FIG. 10, and repeated explanations will not be provided.

Referring to FIG. 12, the dynamic vision sensor according to some example embodiments further includes a current-voltage converter (e.g., IV Converter 410), an analog digital converter (e.g., ADC 420), and/or a control unit 430 (e.g., control circuitry, control processing circuitry, etc.), etc., but is not limited thereto. The shown dynamic vision sensor may measure a dark current.

The ADC 420 may be connected between an output terminal of the current-voltage converter 410 and an input terminal of the control unit 430 to convert a plurality of voltages, e.g., a first voltage $V_{PH1}$ and a second voltage $V_{PH2}$, which are generated from a corresponding plurality of photoreceptors, e.g., a first photoreceptor 310-1 and a second photoreceptor 310-2, and output through the current-voltage converter 410, a corresponding plurality of digital codes, e.g., a first digital code and a second digital code, etc. The ADC 420 may measure the dark current Dout-Dark on the basis of the difference value between the first digital code and the second digital code, but is not limited thereto. At this time, Dout-Dark means a digital code of a dark current value.

The control unit 430 generates a dark control signal on the basis of Dout-Dark and provides it to each photoreceptor 310.

Referring to FIG. 13, according to some example embodiments, the photoreceptor 310 of each pixel X1 may further include a dark current compensation unit 350 (e.g., dark current compensation circuitry, dark current compensation processing circuitry, etc.). The dark current compensation unit compensates the pixel for the dark current according to the dark control signal. Referring to FIG. 14, the dark current compensation unit may include a current source according to some example embodiments.

Figure 15:
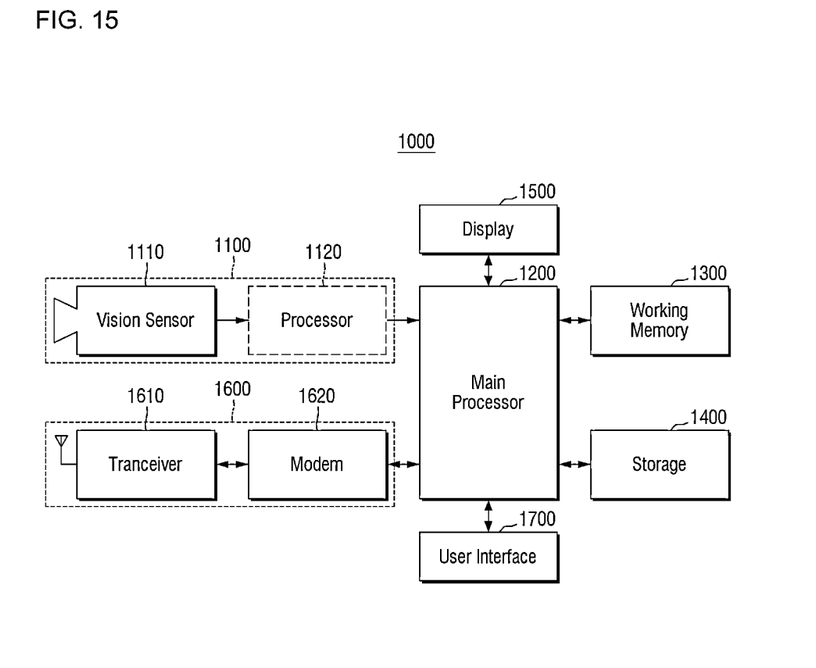
FIG. 15 is a block diagram showing an electronic device to which the image processing device of FIG. 1 according to some example embodiments.

FIG. 15 is a block diagram showing an electronic device to which the image processing device of FIG. 1 according to at least one example embodiment.

For example, an electronic apparatus 1000 may be implemented as a smartphone, a tablet computer, a desktop computer, a laptop computer, and/or a wearable device, etc., but is not limited thereto. Furthermore, the electronic apparatus 1000 may be implemented as one of an unmanned security system, internet of things device, and various types of electronic apparatuses required to operate an autonomous vehicle, a robotic device, a virtual reality and/or augmented reality device, a medical device, etc.

The electronic apparatus 1000 may include an image processing device 1100, a main processor 1200, a working memory 1300, a storage 1400, a display 1500, a communication block 1600, and/or a user interface 1700, etc.

The image processing device 1100 may be an image processing device implemented to execute the methods explained above, e.g., in FIGS. 1 to 11, but the example embodiments are not limited thereto.

On the other hand, the event compensation scheme may also be performed as software and/or firmware by the main processor 1200 instead of the processor 1120, but the example embodiments are not limited thereto. In this case, the event compensator 200, which is firmware and/or software that realizes at least one of the disclosed methods of the example embodiments that compensates for the event occurrence time by the response time, may be loaded into the working memory 1300, and the main processor 1200 may operate this. In this case, since the event compensation scheme is operated/processed by the main processor 1200, the processor 1120 may be omitted in this case.

The working memory 1300 may store data used for the operation of the electronic apparatus 1000. For example, the working memory 1300 may temporarily store packets and/or frames processed by the processor 1120, but is not limited thereto. For example, the working memory 1300 may include volatile memory such as a DRAM (Dynamic RAM), and/or a SDRAM (Synchronous RAM), etc., and/or a non-volatile memory such as a PRAM (Phase-change RAM), a MRAM (Magneto-resistive RAM), a ReRAM (Resistive RAM), and/or a FRAM (Ferro-electric RAM), etc.

The storage 1400 (e.g., storage device and/or mass storage device, etc.) may store firmware and/or software for executing the event compensation scheme. The firmware and/or software for executing the event compensation scheme may be read from the storage 1400 and loaded into the working memory 1300 in response to a request and/or command from the main processor 1200. The storage 1400 may include a non-volatile memory, such as a flash memory, a PRAM, a MRAM, a ReRAM, and/or a FRAM, a disk drive, etc.

The display 1500 may include a display panel and a DSI (display serial interface) peripheral circuit, but is not limited thereto. For example, the display panel may be implemented as various devices, such as a LCD (Liquid Crystal Display) device, a LED (Light Emitting Diode) display device, an OLED (Organic LED) display device, and/or an AMOLED (Active Matrix OLED) display device, etc. A DSI host that is built in the main processor 1200 may perform a serial communication with the display panel through the DSI. The DSI peripheral circuit may include components, such as a timing controller, a source driver, and the like, for operating the display panel.

The communication block 1600 may exchange signals with external devices/systems through an antenna. A transceiver 1610 and/or a MODEM (Modulator/Demodulator) 1620 of the communication block 1600 may process signals exchanged with external devices/systems, according to wireless communication conventions, such as LTE (Long Term Evolution), WIMAX (Worldwide Interoperability for Microwave Access), GSM (Global System for Mobile communication), CDMA (Code Division Multiple Access), Bluetooth, NFC (Near Field Communication), Wi-Fi (Wireless Fidelity), and/or RFID (Radio Frequency Identification), etc.

The user interface 1700 may include at least one input interface, such as a keyboard, a mouse, a keypad, a microphone, a camera, a button, a touch panel, a touch screen, a touch pad, a touch ball, a gyroscope sensor, a vibration sensor, and/or an acceleration sensor, etc.

The components of the electronic apparatus 1000 may exchange data according to one or more of interface conventions, such as USB (Universal Serial Bus), SCSI (Small Computer System Interface), PCIe (Peripheral Component Interconnect Express), M-PCIe (Mobile PCIe), ATA (Advanced Technology Attachment), PATA (Parallel ATA), SATA (Serial ATA), SAS (Serial Attached SCSI), IDE (Integrated Drive Electronics), EIDE (Enhanced IDE), NVMe (Nonvolatile Memory Express), and/or UFS (Universal Flash Storage), etc.

In concluding the detailed description, one of ordinary skill in the art will appreciate that many variations and modifications may be made to the example embodiments without substantially departing from the principles of the inventive concepts. Therefore, the disclosed example embodiments of the inventive concepts are used in a generic and descriptive sense only, and are not for purposes of limitation.

What is claimed is:

1. A dynamic vision sensor (DVS) comprising:
    a pixel array including at least a first photoreceptor and a second photoreceptor, the first photoreceptor and the second photoreceptor including at least one first pixel and at least one second pixel, respectively,
    the at least one first pixel and the at least one second pixel configured to generate at least one first photocurrent and at least one second photocurrent in response to an incident light, respectively, and
    the first photoreceptor and the second photoreceptor configured to output a first and second log voltages based on the at least one first photocurrent and the at least one second photocurrent, respectively;
    processing circuitry configured to,
        amplify the first and second log voltages,
        detect a change in intensity of the light based on the amplified first log voltage, the amplified second log voltage, and a reference voltage, and
        output an event signal corresponding to the detected change in intensity of light;
    a first switch configured to alternately directly connect a first output node of the first photoreceptor between a power supply voltage node and a first node; and
    a second switch configured to alternately directly connect a second output node of the second photoreceptor between the power supply voltage node and the first node.

2. The dynamic vision sensor of claim 1, wherein the processing circuitry is further configured to:
    calculate a sum of the at least one first photocurrent generated by the at least one first pixel included in the first photoreceptor;
    calculate a sum of the at least one second photocurrent generated by the at least one second pixel included in the second photoreceptor; and
    measure a pixel photocurrent based on a difference between the sums of the first photocurrent and the second photocurrent.

3. The dynamic vision sensor of claim 1, further comprising:
    a first inverting switch connected between the first output node and the first node and is configured to be turned on alternately with the first switch; and
    a second inverting switch connected between the second output node and the first node and is configured to be turned on alternately with the second switch; and
    the first switch and the second switch are configured to be alternately turned on from each other.

4. The dynamic vision sensor of claim 3, wherein
    the first switch and the second inverting switch are PMOS transistors,
    the second switch and the first inverting switch are NMOS transistors, and
    the first and second switches and the first and second inverting switches are gated using a same enable signal.

5. The dynamic vision sensor of claim 3, further comprising:
    an inverter configured to invert an enable signal to generate an inverted enable signal,
    the first switch and the second inverting switch are configured to be turned on by the enable signal, and
    the second switch and the first inverting switch are configured to be turned on by the inverted enable signal.

6. The dynamic vision sensor of claim 1, wherein the first node is connected to an input/output (I/O) pad.

7. The dynamic vision sensor of claim 1, further comprising:
    a current-voltage converter with a first end connected to the first node; and
    an analog digital converter connected to a second end of the current-voltage converter.

8. The dynamic vision sensor of claim 7, wherein the processing circuitry is further configured to:
    receive a first digital code associated with the first photoreceptor and a second digital code associated with the second photoreceptor from the analog digital converter; and
    determine a difference between the first digital code and the second digital code to measure a pixel photocurrent.

9. A dynamic vision sensor (DVS) comprising:
    a first photoreceptor including N pixels, the first photoreceptor configured to output a first log voltage based on a first photocurrent generated in response to an incident light, where N is a natural number, the first photocurrent being a sum of photocurrents generated by the N pixels;
    a second photoreceptor including M pixels, the second photoreceptor configured to output a second log voltage based on a second photocurrent generated in response to the incident light, where M is a natural number different from N, the second photocurrent being a sum of photocurrents generated by the M pixels;
    processing circuitry configured to,
        amplify a first log voltage and a second log voltage associated with the first and second photoreceptors, respectively, detect a change in intensity of light based on the amplified first log voltage, the amplified second log voltage, and a reference voltage, output an event signal corresponding to the detected change in intensity of light, and determine a pixel average photocurrent based on a current difference value between the first photocurrent and the second photocurrent;

a first switch configured to alternately connect a first output node of the first photoreceptor to a power supply voltage node or an input/output (I/O) pad; and a second switch configured to alternately connect a second output node of the second photoreceptor to the power supply voltage node or the I/O pad.

10. The dynamic vision sensor of claim 9, wherein the processing circuitry is further configured to:

calculate the pixel average photocurrent by dividing the current difference value by a difference value between a total number of the N pixels and a total number of the M pixels, and measure a total photocurrent obtained by multiplying the pixel average photocurrent by a total number of the first photoreceptor and the second photoreceptor.

11. The dynamic vision sensor of claim 9, further comprising:

a first inverting switch connected between the first output node and the I/O pad and is configured to be turned on alternately with the first switch;

a second inverting switch which is connected between the second output node and the I/O pad and is configured to be turned on alternately with the second switch; and the first switch and the second switch are configured to be alternately turned on from each other.

12. The dynamic vision sensor of claim 11, wherein the first switch and the second inverting switch are both configured to be turned on by an enable signal, and the second switch and the first inverting switch are both configured to be turned on by an inverted enable signal.

13. The dynamic vision sensor of claim 9, further comprising:

a current-voltage converter configured to convert the first photocurrent to the first or the second photocurrent to the second log voltage;

an analog digital converter configured to convert the first log voltage into a first digital code or the second log voltage into a second digital code;

the first switch is further configured to alternately connect the first photoreceptor to a power supply voltage node or an input terminal of the current-voltage converter; and the second switch is further configured to alternately connect the second photoreceptor to the power supply voltage node or an input terminal of the current-voltage converter.

14. The dynamic vision sensor of claim 13, wherein the processing circuitry is further configured to detect the pixel average photocurrent based on a difference between the first digital code and the second digital code.

15. The dynamic vision sensor of claim 9, wherein the first switch is further configured to connect a first output node of the first photoreceptor to a power supply voltage node or a first I/O pad in accordance with an enable signal; and the second switch is further configured to connect a second output node of the second photoreceptor to the power supply voltage node or a second I/O pad in accordance with the enable signal.

16. An image processing device comprising:

a plurality of Dynamic Vision Sensor (DVS) pixel arrays, each of the plurality of DVS pixel arrays belonging to either a first photoreceptor or a second photoreceptor, and the plurality of DVS pixel arrays each configured to output a log voltage based on a photocurrent generated in response to an incident light;

processing circuitry configured to, amplify the log voltage, detect a change in intensity of the light based on the amplified log voltage and a reference voltage, and output an event signal corresponding to the detected change in intensity of the light, issue a time stamp related to time at which the event signal changes, generate and outputs event data packets based on an addresses of the pixel, the event signal, and the time stamp, determine a first photocurrent based on a sum of photocurrents generated by the pixel arrays belonging to the first photoreceptor, determine a second photocurrent based on a sum of photocurrents generated by the pixel arrays belonging to the second photoreceptor, and detect an average photocurrent based on a current difference value between the first photocurrent and the second photocurrent;

a first switch configured to connect a first output node of the first photoreceptor to a power supply voltage node or a first I/O pad in accordance with an enable signal; and a second switch configured to connect a second output node of the second photoreceptor to the power supply voltage node or a second I/O pad in accordance with the enable signal.

17. The image processing device of claim 16, wherein the first photoreceptor and the second photoreceptor are alternately enabled.

18. The image processing device of claim 16, further comprising;

a current-voltage converter configured to convert the first photocurrent into a first voltage or the second photocurrent into a second voltage;

an analog digital converter configured to convert the first voltage into a first digital code or convert the second voltage into a second digital code;

the first switch is further configured to alternately connect the first photoreceptor to a power supply voltage node or an input terminal of the current-voltage converter; and the second switch is further configured to alternately connect the second photoreceptor to the power supply voltage node or the input terminal of the current-voltage converter.

19. The image processing device of claim 16, wherein the first photoreceptor and the second photoreceptor are configured to be enabled or disabled at the same time.

* * * * *